United States Patent Office 3,254,108
Patented May 31, 1966

3,254,108
PROCESS FOR PREPARATION OF ARYLIMINO PROPIONATES
Cataldo A. Maggiulli and Raymond E. Paine, Rochester, N.Y., assignors to Eastman Kodak Company, Rochester, N.Y., a corporation of New Jersey
No Drawing. Filed Feb. 18, 1963, Ser. No. 259,391
4 Claims. (Cl. 260—465)

This invention is related to color photography and more particularly to the synthesis of 1-substituted-3-anilino-2-pyrazolin-5-ones for use in color photography.

The formation of colored photographic images by coupling the development product, that is, oxidized primary aromatic amino developing agents with color forming or coupling compounds is well known. In these processes the subtractive process of color formation is ordinarily used in which phenolic or naphtholic couplers are used to produce the cyan dye, 2-pyrazolin-5-ones are used to produce the magenta dye, and compounds having an active methylene group separating two carbonyl groups are used to form the yellow dye.

Certain methods known previously for preparing 3-anilino-2-pyrazolin-5-ones are limited as to the substituents that can be present on the anilino group. For example, one method described by Porter et al. in U.S. Patent 2,343,703, issued March 7, 1944, involves the reaction of a 3-amino-2-pyrazolin-5-one and a substituted amine with elimination of ammonia. This method is useful for the preparation of 3-alkamino-2-pyrazolin-5-ones but fails when an arylamine is used that is less basic than aniline. Attempts to react arylamines less basic than aniline or arylamines having a substituent in the ortho position (for example, o-anisidine) with 3-amino-2-pyrazolin-5-one results in the self-condensation product imino-3,3′-bis-2-pyrazolin-5-one instead of the desired 3-anilino-2-pyrazolin-5-one derivative. Another method, the Smiles rearrangement has been used to prepare 3-(o- and p-nitroanilino)-2-pyrazolin-5-ones by the deacylation of the corresponding nitrophenoxyacetamido derivative as shown by Beavers U.S. Patent 2,983,608, issued May 9, 1961. This reaction is applicable only to the synthesis of 3-(o- or p-nitroanilino) derivatives; however, rearrangement does not occur with the m-nitrophenoxy analog or with other p-substituted phenoxyacetamido-2-pyrazolin-5-ones.

Certain other available synthesis have not been practical for various reasons, such as poor yields, high cost, numerous steps, etc.

A synthesis that can be used to prepare a large variety of substituted 3-anilino-2-pyrazolin-5-ones is desired.

It is therefore an object of our invention to provide a valuable synthesis for the preparation of various 1-aryl-, and 1-alkyl-3-anilino-2-pyrazolin-5-ones that are highly desirable for use in color photography but which in many instances could not be produced economically or conveniently by methods know before.

Another object of our invention is to provide a synthesis by which all steps of the reactions are carried out in the same reaction vessel and in most instances without isolation of any intermediate.

Still another object is to provide a synthesis for producing various 3-(substituted anilino)-2-pyrazolin-5-ones in good yields.

Still further objects will become evident from the following specification and claims.

These and other objects are accomplished according to our invention by the use of our novel synthesis for 1-aryl- and 1-alkyl-3-arylamino-2-pyrazolin-5-ones.

According to our invention valuable magenta-forming couplers are produced by intermixing alkyl-β-halo-β-arylamino acrylates or their tautomers the corresponding alkyl β-halo-β-arylimino propionates with an aryl- or an alkylhydrazine preferably in the presence of an acid acceptor. This reaction produces the corresponding alkyl 3-arylamino-3-arylhydrazono propionate or alkyl 3-arylamino-3-alkylhydrazono propionate which undergoes ring closure to produce the corresponding 1-aryl- or 1-alkyl-3-arylamino-2-pyrazolin-5-one. In those instances where a 2,6-substituted arylhydrazine is used in the synthesis, the reaction stops with the formation of the corresponding 3-(2,6-substituted arylhydrazono) propionate. This intermediate is then cyclized by treating it with a cyclization agent. Although no solvent is required for these reactions, it is advantageous to use a dry organic solvent.

The alkyl β-halo-β-arylamino acrylates (and their corresponding tautomers the alkyl β-halo-β-arylimino propionates) used in this reaction are prepared advantageously by mixing the corresponding alkyl malonanilate with a halogenating agent. Although no solvent is required for this reaction, it is advantageous to use a suitable organic solvent.

Our synthesis in the preferred form comprises the steps of:

(1) Reacting a compound represented by the formula:

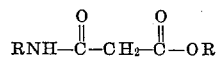

wherein R represents an aromatic group, such as phenyl, a cyanophenyl, e.g., 4-cyanophenyl, 2-cyanophenyl, etc., a trifluoromethylphenyl, e.g., 4-trifluoromethylphenyl, 2-trifluoromethylphenyl, etc., a carboalkoxyphenyl, e.g., 2-carbomethoxyphenyl, 3-carboethoxyphenyl, 4-carbobutoxyphenyl, 4-carbooctadecyloxyphenyl, etc., a nitrophenyl group, e.g., 4-nitrophenyl, 3-nitrophenyl, 2-nitrophenyl, a halophenyl, e.g., 2-chlorophenyl, 2,4-dichlorophenyl, 2-bromophenyl, 4-bromophenyl, 2,4-dibromophenyl, 2-fluorophenyl, etc., an alkylphenyl, e.g., 2-methylphenyl, 4-ethylphenyl, 3-propylphenyl, 4-nonylphenyl, etc., an alkoxyphenyl, e.g., 3-methoxyphenyl, 4-propoxyphenyl, 3-nonoxyphenyl, etc., an arylphenyl, e.g., p-diphenyl, etc., an aryloxphenyl, e.g., phenoxyphenyl, etc., an N-substituted benzamidophenyl, e.g., N-methyl benzamidophenyl, N-butyl benzamidophenyl, etc., an N,N-disubstituted carbamylphenyl, e.g., N,N-diphenyl carbamylphenyl, N,N-dibutyl carbamylphenyl, N,N-dioctadecyl carbamylphenyl, etc., an N,N-disubstituted sulfamylphenyl, e.g., N,N-diphenyl sulfamylphenyl, N,N-dibutyl sulfamylphenyl, N,N-dioctadecyl sulfamylphenyl, etc., a phenyl N-substituted sulfonamidophenyl, e.g., phenyl N-methyl sulfonamidophenyl, phenyl N-phenyl sulfonamidophenyl, etc., and various combinations of these, such as 2-methyl-5-nitrophenyl, 2-chloro-5-cyanophenyl, 2-cyano-5-nitrophenyl, 2-chloro-4-methoxyphenyl, 2,4-dichloro-6-methylphenyl, 2,6-dichloro-4-nitrophenyl, 2-chloro-4,6-dimethylphenyl, etc., α-naphthyl, β-naphthyl, etc.; and R′ represents an alkyl group having from 1 to 4 carbon atoms such as methyl, ethyl, propyl, butyl, etc., with a halogenating agent dissolved in a suitable organic solvent, then when the reaction is completed, (2) Removing substantially all of the organic solvent by distillation, (3) Dissolving the residue in a dry organic solvent and reacting it with a substituted hydrazine having the formula:

$$R^2NHNH_2$$

wherein $R^2$ represents an alkyl group having from 1 to 18 carbon atoms, such as methyl, ethyl, propyl, 4-chlorobutyl, 4-nitroamyl, 4-carbomethoxybutyl, hexyl, octyl, decyl, octadecyl, etc., or an aryl group, such as phenyl, a halophenyl, e.g., 2-chlorophenyl, 2-bromophenyl, 2,6-dichlorophenyl, 2,4,6-trichlorophenyl, 3,5-dibromophenyl, 4-fluorophenyl, etc., a cyanophenyl, e.g., 4-cyanophenyl, 2-cyanophenyl, etc., a nitrophenyl, e.g., 4-nitrophenyl, 3-nitrophenyl, an alkphenyl, e.g., 4-methylphenyl, 2,6-dimethylphenyl, 3-propylphenyl, 4-butylphenyl, etc., a fluoroalkylphenyl, e.g., 4-trifluoromethylphenyl, 2-trifluoromethylphenyl, etc., an alkoxy phenyl, e.g., 2-ethoxyphenyl, 4-butoxyphenyl, etc., an arylphenyl, e.g., 4-phenylphenyl, etc., an aryloxyphenyl, e.g., phenoxyphenyl, etc., an N-substituted benzamidophenyl, e.g., N-methyl benzamidophenyl, N-butyl benzamidophenyl, etc., an N,N-disubstituted carbamylphenyl, e.g., N,N-diphenyl carbamylphenyl, N,N-dibutyl carbamylphenyl, N,N-dioctadecyl carbamylphenyl, etc., an N,N-disubstituted sulfamyl phenyl, e.g., N,N-dihpenyl sulfamylphenyl, N,N-dibutyl sulfamylphenyl, N,N-dioctadecylsulfamylphenyl, etc., a phenyl N-substituted sulfonamidophenyl, e.g., phenyl N-methyl sulfonamidophenyl, phenyl N-phenyl sulfonamidophenyl, etc., and various combinations of these, such as 2-methyl-5-nitrophenyl, 2-chloro-5-cyanophenyl, 5-chloro-2-methylphenyl, 2,6-dichloro-4-methoxyphenyl, 2,4-dichloro-6-methylphenyl, 2,6-dichloro - 4 - nitrophenyl, 2-chloro-4,6-dimethylphenyl, etc., in the presence of an acid acceptor, and after the reaction is completed, (4) Removing the organic solvent by distillation and then purifying the resulting 1-alkyl- or 1-aryl - 3-arylamino-2-pyrazolin-5-one by conventional means.

In an alternative method the organic solvent is removed from the reaction mixture in steps 2 and 4 by adding a second solvent such as ligroin that precipitates the reaction product from the organic solvent in the reaction mixture so that the latter solvent can then be removed without distillation.

The 1-substituted-3-(anilino)-2 - pyrazolin-5-one couplers produced by our synthesis are represented to advantage by the formula:

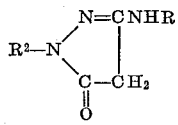

wherein R and $R^2$ are as described previously.

In syntheses using an aryl hydrazine that is substituted in both the 2 and 6 positions, the reaction usually stops with the formation of the alkyl 3-aryl-3-(2,6-substituted aryl hydrazono)propionate and the following additional step is required.

(5) Treating an alcohol (e.g., ethyl alcohol) solution made of the hydrazono derivative (remaining in step 4 after removal of the solvent) with an alcohol solution of a cyclization agent, preferably by heating to the boiling point of the solvent and refluxing until the reaction is completed, after which the 2-pyrazolin-5-one derivative is purified by conventional means.

Although it is not necessary to isolate the hydrazono derivative in those instances where the reaction in step 4 stops with the formation of the hydrazono derivative, it is desirable to do this. This is easily done by dissolving the residue left in step 4 (after removal of the solvent) in alcohol, precipitating the hydrazono derivative by adding water, filtering, washing with alcohol and drying. This purified hydrazino derivative is then dissolved in alcohol and treated with the alcohol solution of the cyclization agent.

Unless it is desired to isolate the hydrazino derivative as described, there is no need to remove from the reaction vessel used any of the intermediate compounds formed in our synthesis. This not only is very convenient but eliminates loss of intermediate compounds and results in good yields of product.

The reactants can be used in various concentrations, however we have found that it is preferred to use approximately equimolar amounts.

The halogenation reaction and the following reaction of the halogen derivative with the substituted hydrazine can be conducted at temperatures below about 150° C., however in general we have found that it is preferable to use temperatures of from about 10° to 15° C. in order to obtain optimum yields. The reactions are exothermic and cooling is advantageous. For best results the distillation in steps 2 and 4 are performed under vacuum and at temperatures below about 80°, however they can be performed at atmospheric pressure.

Any organic solvent that is inert to the reactants and the intermediates formed, can be used to advantage. It is preferable that the solvents be immiscible with water and have boiling points that are above the boiling points of the halogenating agent and the acid acceptor. Useful solvents include materials such as toluene, benzene, xylene, etc.

Phosphorous pentachloride is used to advantage as the halogenating agent.

Any acid acceptors used in organic syntheses can be used to advantage. Typical examples illustrating useful acid acceptors include aliphatic tertiary amines, such as triethylamine, etc., aromatic tertiary amines, such as N,N-dimethylaniline, etc., a heterocyclic base, such as pyridine or a molar equivalent of the hydrazine that is used in the reaction. Although it is possible to introduce the acid acceptor when the hydrazine compound is added to the reaction mixture (in step 3) we have found that it is advantageous to add the acid acceptor to the reaction mixture after the hydrazine compound has been stirred into the reaction mixture for from 5 to 30 minutes.

Cyclization agents used to advantage include the alkali metal alkoxides in which the alkoxide group has from 1 to 5 carbon atoms, such as sodium methoxide, potassium ethoxide, sodium ethoxide, sodium propoxide, sodium amyloxide, etc., the alkaline earth hydroxides, such as barium hydroxide, calcium hydroxide, etc., the alkali metal carbonates, such as sodium carbonate, potassium carbonate, etc., sodium hydroxide, acetic acid, propionic acid, etc. The cyclization agent can be used to advantage in a wide range of concentrations, the optimum concentrations being readily determined by trial. We have found that usually from 1 to 2 molar equivalents of agents such as the alkali metal alkoxides are preferred, while only about 0.01 to 0.1 mole of the alkali metal carbonates are needed.

The following specific syntheses will still further illustrate our invention.

EXAMPLE 1

3-(p-cyanoanilino)-1-phenyl-2-pyrazolin-5-one

In a 1-l. flask fitted with reflux condenser and stirrer were placed 350 ml. of toluene and 33 g. (0.16 mole) of phosphorus pentachloride. These reactants were heated until solution took place. The solution was cooled to 10–15° C. and 35 g. (0.15 mole) of ethyl p-cyanomalonanilate was added and the reaction mixture stirred for 30 minutes at 10° C. The reaction flask was then placed under vacuum and the toluene completely removed by vacuum distillation. The reaction flask was heated gently on a steampot so that the temperature of the reaction mixture did not exceed 50° C. during this operation. The residue was then dissolved in 300 ml. of dry benzene and cooled to 10° C. To the solution was added 23 g. (0.15 mole) of phenylhydrazine and the mixture stirred ½ hour, after which 15.1 g. (0.15 mole) of triethylamine was added and stirring was continued for 3 hours. The reaction flask was again placed under vacuum and the benzene removed by distillation. The residue was dissolved in 200 ml. of ethyl alcohol and 50 ml. of water was added to precipitate the product. The solid was filtered, washed well with alcohol and dried.

There was obtained 23 g. of 3-(p-cyanoanilino)-1-phenyl-2-pyrazolin-5-one, M.P. 268° C., which was 55% of the theoretical amount of 41.5 g.

The preceding synthesis is typical of those used to advantage for preparing 1-aryl-3-(anilino)-2-pyrazolin-5-one couplers which have no substituents on the 2 and 6 positions of the 1-aryl group. The following synthesis is typical of those used to advantage for preparing couplers in which the 1-aryl group has substituents on the 2,6-positions. As indicated previously, herein, the synthesis of such compounds does not involve the spontaneous cyclization of the hydrazino intermediate as occurs in Example 1 but requires a separate cyclization step.

EXAMPLE 2

3-(p-cyanoanilino)-1-(2,4,6-trichlorophenyl)-2-pyrazolin-5-one

In a 1-l. flask fitted with stirrer, reflux condenser and thermometer well were placed 33 g. (0.16 mole) of phosphorus pentachloride and 350 ml. of toluene. These ingredients were heated to 60° C. to completely dissolve the phosphorus pentachloride. The solution was cooled to 10–15° C. with cooling water and 35 g. (0.15 mole) of ethyl p-cyanomalonanilate was added with stirring while the temperature was maintained at 10° C. for ½ hour. The reaction flask was placed under vacuum and the toluene was completely distilled, keeping the temperature of the reaction mixture below 50° C. The residue was dissolved in 350 ml. of dry benzene, cooled to 10° C. and 32 g. (0.15 mole) of 2,4,6-trichlorophenyl hydrazine was added. The reaction mixture was stirred for 15 minutes while the temperature was maintained at 10° C., then 15 g. (0.15 mole) of triethylamine was added and stirring continued for an additional 3 hours. The benzene was removed by vacuum distillation and the residue mixed with 100 ml. of methyl alcohol. The solid product which separated was cooled, collected by filtration, then washed well with methyl alcohol.

On drying there was obtained 45 g. of ethyl 3-(p-cyanoanilino)-3-(2,4,6 - trichlorophenylhydrazono)propionate, M.P. 174°–176° C., which was 70% of the theoretical amount of 64 g.

In a 2.2-l. flask fitted with stirrer and reflux condenser were placed 67.0 g. (0.15 mole) of ethyl 3-(p-cyanoanilino)-3-(2,4,6 - trichlorophenylhydrazono)propionate and 450 ml. of methanol. A solution containing 17.0 g. (0.3 mole) of sodium methoxide dissolved in 150 ml. of methanol was added to this slurry and the mixture was refluxed for 2 hours. The solution was cooled to 30° C. and 50.0 ml. of glacial acetic acid was added to precipitate the product. The solid was collected on a filter and dried.

There was obtained 53.5 g. of 3-(p-cyanoanilino)-1-(2,4,6-trichlorophenyl)-2-pyrazolin-5-one, M.P. 297–300° C. (dec.), which was 94% of the theoretical amount of 57.0 g.

EXAMPLE 3

3-(m-nitroanilino)-1-(2,4,6-trichlorophenyl)-2-pyrazolin-5-one

This coupler was prepared by the process described in Example 2 but substituting an equimolar amount of ethyl m-nitromalonanilate for the ethyl p-cyanomalonanilate. The ethyl 3-(m-nitroanilino)-3-(2,4,6-trichlorophenylhydrazone)propionate was isolated and purified to give a 53% yield, M.P. 152°–153° C. This compound was cyclized as described to give the corresponding coupler, M.P. 250° C.

EXAMPLE 4

3-(p-carbomethoxyanilino)-1-(3,5-dicarbomethoxyphenyl)-2-pyrazolin-5-one

This coupler was prepared by the method described in Example 1 by chlorinating an equimolar amount of ethyl p-carbomethoxymalonanilate (produced by reacting equimolar amounts of ethyl chloroformyl acetate and 4-carbomethoxyaniline) and reacting the chlorinated product with an equimolar amount of 3,5-dicarbomethoxyphenyl hydrazine. The coupler obtained in 70% yield had a M.P. of 274° C.

EXAMPLE 5

3-(p-cyanoanilino)-1-(p-nitrophenyl)-2-pyrazolin-5-one

This coupler was prepared by the method described in Example 1 by substituting an equimolar amount of 4-nitrophenylhydrazine for phenylhydrazine. The coupler prepared in 40% yield had a M.P. of 224°–225° C.

EXAMPLE 6

3-(2,4-dichloroanilino)-1-(2,6-dichloro-4-nitrophenyl)-2-pyrazolin-5-one

This coupler was prepared by the method described in Example 2 by substituting an equimolar amount of ethyl 2,4-dichloromalonanilate (prepared by reacting diethylmalonate with 2,4-dichloroaniline) for ethyl p-cyanomalonanilate and substituting an equimolar amount of 2,6-dichloro-4-nitrophenylhydrazine for 1-(2,4,6-trichlorophenylhydrazine). The coupler had a M.P. of 229°–231° C.

Although the illustrative examples given use triethylamine as the acid acceptor, any of the other acid acceptors described are used with equal advantage. Similarly, any of the cyclization agents described are used in our syntheses in place of sodium methoxide where a cyclization agent is required.

The 2-pyrazolin-5-one couplers prepared by our synthesis are valuable for use in color photography to produce magenta dye images by reacting one of these couplers with the imagewise oxidized primary aromatic amino developing agent produced by development of image exposed silver halide in a photographic element. Diffusible 2-pyrazolin-5-one couplers are used in the color developer solution containing the primary aromatic amino developing agent. Nondiffusible 2-pyrazolin-5-one couplers are incorporated in color photographic elements, usually in the green-sensitive silver halide emulsion layer.

The 1-substituted-3-(anilino)-2-pyrazolin-5-one coupler synthesis of our invention provides a convenient and economical method for producing a large number of these couplers. Our method does not have the limited utility of some of the prior art syntheses nor the great expense and inconvenience of other available methods.

The invention has been described in detail with particular reference to preferred embodiments thereof but it will be understood that variations and modifications can be effected within the spirit and scope of the invention as described hereinabove and as defined in the appended claims.

We claim:

1. A process for making an alkyl β-chloro-β-arylimino propionate comprising the step of:
   intermixing a compound having the formula:

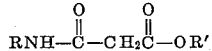

wherein R represents an aromatic group selected from the class consisting of a phenyl group and a naphthyl group; and R' represents an alkyl group having from 1 to 4 carbon atoms, with phosphorous pentachloride at a temperature below about 150° C.

2. A process for making ethyl β-chloro-β-(p-cyanophenylimino) propionate comprising the step of intermixing ethyl p-cyanomalonanilate with phosphorous pentachloride dissolved in toluene at a temperature below about 150° C.

3. A process for making ethyl β-chloro-β-(m-nitrophenylimino) propionate comprising the step of intermixing ethyl m-nitromalonanilate with phosphorous pentachloride dissolved in toluene at a temperature below about 150° C.

4. A process for making ethyl β-chloro-β-(2,4-dichlorophenylimino) propionate comprising the step of intermixing ethyl 2,4-dichloromalonanilate with phosphorous pentachloride at a temperature below about 150° C.

References Cited by the Examiner

UNITED STATES PATENTS

| 2,376,380 | 5/1945 | Porter et al. | 260—310 |
| 2,484,785 | 10/1949 | Druey | 260—250 |
| 2,511,231 | 6/1950 | Weissberger et al. | 260—310 |
| 3,054,802 | 9/1962 | Rutschmann | 260—559 |

WALTER A. MODANCE, *Primary Examiner.*

NICHOLAS S. RIZZO, *Examiner.*

NATALIE TROUSOF, *Assistant Examiner.*